United States Patent
Nemchick et al.

(10) Patent No.: US 7,758,786 B2
(45) Date of Patent: Jul. 20, 2010

(54) METHOD AND APPARATUS FOR FABRICATING ARTICLES HAVING TEXTURED SURFACES

(75) Inventors: John D. Nemchick, Stanwood, WA (US); Michael P. Kuntz, Snohomish, WA (US); Brian L. Davis, Bothell, WA (US)

(73) Assignee: The Boeing Company, Chicago, IL (US)

( * ) Notice: Subject to any disclaimer, the term of this patent is extended or adjusted under 35 U.S.C. 154(b) by 122 days.

(21) Appl. No.: 11/848,545

(22) Filed: Aug. 31, 2007

(65) Prior Publication Data

US 2009/0057947 A1 Mar. 5, 2009

(51) Int. Cl.
*B29C 71/00* (2006.01)
(52) U.S. Cl. .................. 264/236; 264/258; 264/293; 264/314
(58) Field of Classification Search .......... 264/257, 264/258, 236, 293, 214
See application file for complete search history.

(56) References Cited

U.S. PATENT DOCUMENTS

| 6,319,346 B1 * | 11/2001 | Clark et al. ............... 156/156 |
| 6,699,419 B1 * | 3/2004 | Kia et al. ................. 264/219 |
| 2006/0234010 A1 * | 10/2006 | Wirrick et al. ............ 428/174 |

FOREIGN PATENT DOCUMENTS

GB 2259883 A * 3/1993

* cited by examiner

*Primary Examiner*—Joseph S Del Sole
*Assistant Examiner*—James Sanders
(74) *Attorney, Agent, or Firm*—Tung & Associates

(57) ABSTRACT

Decorative textured surfaces are formed on articles having curved or contoured surfaces. A reusable, flexible textured blanket is placed in a mold along with a first material charge. A pressurizer is used to both impart the texture of the blanket to the first material charge and consolidate the charge to form a textured shell. The blanket is removed from the mold and a second material charge is introduced into the mold over the shell. The application of heat and pressure consolidates the second material charge and the shell to both form and cure the completed article.

12 Claims, 9 Drawing Sheets

METHOD AND APPARATUS FOR FABRICATING ARTICLES HAVING TEXTURED SURFACES

TECHNICAL FIELD

This disclosure generally relates to equipment and methods for fabricating articles having textured surfaces, especially curved or contoured panels, and deals more particularly with a method and apparatus for forming a textured article using a single mold.

BACKGROUND

Various manufactured articles are provided with textured surfaces for decorative purposes and/or to mask underlying features or irregularities. For example, in the aircraft industry, composite parts such as curved interior cabin panels are provided with decorative, textured surfaces in order to visually mask underlying structure.

Decorative interior panels for aircraft may be fabricated using a "crushed-core" compression molding process, in which a composite sandwich layup having a honeycomb core is compressed and partially crushed in a compression press. The outer visible surfaces of the panel are covered with a textured film that is formed in a separate labor and capital intensive process employing a multiple opening press (MOP). Following fabrication in the MOP, the textured decorative film must be glued to the panel in a separate vacuum forming operation that requires the use of infrared ovens and flammable spray adhesives.

Attempts have been made to form decorative, textured surfaces on panels while they are being formed in a compression mold, however these attempts have not been successful where the panels possess curvature or surface contours. The textured pattern of the mold tool face, which is used to emboss a decorative pattern on the decorative film, tend to lock the film within the mold, resulting in damage to the decorative film during removal of the panel from the mold. Moreover, because the thin, in-mold decorative film is subjected to the same relatively high force used to form the panel, some underlying rough surface features of the pre-preg skin and/or the panel core pattern may be visible through the decorative film.

Accordingly, there is a need for a method and apparatus for fabricating articles such as panels having textured surfaces that overcome the problems discussed above. Embodiments of the disclosure are intended to satisfy this need.

SUMMARY

Embodiments of the disclosure provide a method and apparatus for fabricating articles such as curved or contoured panels having textured surfaces that may be formed in a single compression mold. The method employs a two step process in which a textured shell is formed in the mold, following which the mold is used to form and consolidate a panel with the shell. The shell is formed in the mold using a textured, flexible blanket which acts as a tool for embossing a surface of the shell with a desired texture. A pressure chamber placed over the mold is used to press the shell against the textured blanket, thereby imparting the texture on the blanket to the surface of the shell. The method eliminates the decorative laminate texturing step previously used in multi-opening presses, as well as the need for vacuum forming processes. The method may employ aluminum, crushed-core mold dies rather than more expensive, chrome plated tool steel dies required by prior processes.

According to one method embodiment, fabrication of a composite panel having a decorative textured surface comprises the steps of: placing a tool having a textured surface in a mold; placing a first composite charge in the mold over the tool; pressing the textured surface of the tool into a first side of the first composite charge while the first composite charge is in the mold; placing a second composite charge in the mold over the first composite charge; and, consolidating the first and second charges together using the mold. The tool may include a flexible, embossing blanket placed in the mold which conforms to the contours of the mold cavity. The textured surface of the tool may be pressed into the first composite charge using a flexible, inflatable bladder that is placed over the tool and is inflated with air or other fluid. The first composite charge may comprise an embossable polymer film and at least one layer of pre-preg. The second composite charge may be formed by laying up multiple layers of pre-preg and/or core materials over the first composite charge.

According to another method embodiment, a contoured article having a textured surface may be fabricated by the steps comprising: placing a textured, flexible tool in a contoured mold; placing a first material charge in the contoured mold over the flexible tool; using the flexible tool and the contoured mold to form a contoured shell having a textured outer surface; placing a second material charge in the mold over the surface of the contoured shell; and, consolidating the second material charge and the contoured shell together using the mold. The flexible tool may comprise a flexible blanket that is placed within and conforms to the contour of a mold cavity used to mold the article. Following consolidation of the material charges, the mold is opened, the article is removed from the mold and the flexible tool is separated from the article.

According to another disclosed embodiment, apparatus is provided for making an article having a contoured, textured surface, comprising: a mold having a contoured mold cavity for receiving a material charge therein; a flexible tool having a textured surface on one side thereof, the flexible tool being removably installed in and conforming to the shape of at least a portion of the contoured mold cavity; and, a pressurizer positionable over the mold cavity for pressing the material charge against the combination of the flexible tool and the mold cavity. The mold may include first and second separable mold portions, wherein the first mold portion includes the contoured mold cavity therein and the second mold portion includes a male feature for consolidating and molding the material charge. The flexible tool may include an embossing blanket having a textured surface. The pressurizer may comprise an inflatable bladder that may be sealed against the mold and pressurized.

According to another disclosed embodiment, apparatus is provided for fabricating a contoured composite panel having a decorative outer surface, comprising: a mold into which a composite charge may be introduced, the mold having contoured male and female portions relatively movable to allow the mold to be opened; a flexible tool member having a textured surface on one side thereof, the flexible tool member being removably positionable in and conforming to the shape of the female mold portion; and, a pressurizer positionable over the female mold portion for applying pressure to the flexible tool member. The flexible tool member may include an embossing blanket having textured surface features which are transferred to the outer surface of the panel. The pressurizer may include an inflatable bladder which is sealed against the female mold portion to apply uniform pressure across the flexible tool member.

Other features, benefits and advantages of the disclosed embodiments will become apparent from the following description of embodiments, when viewed in accordance with the attached drawings and appended claims.

BRIEF DESCRIPTION OF THE ILLUSTRATIONS

Figure 2A:
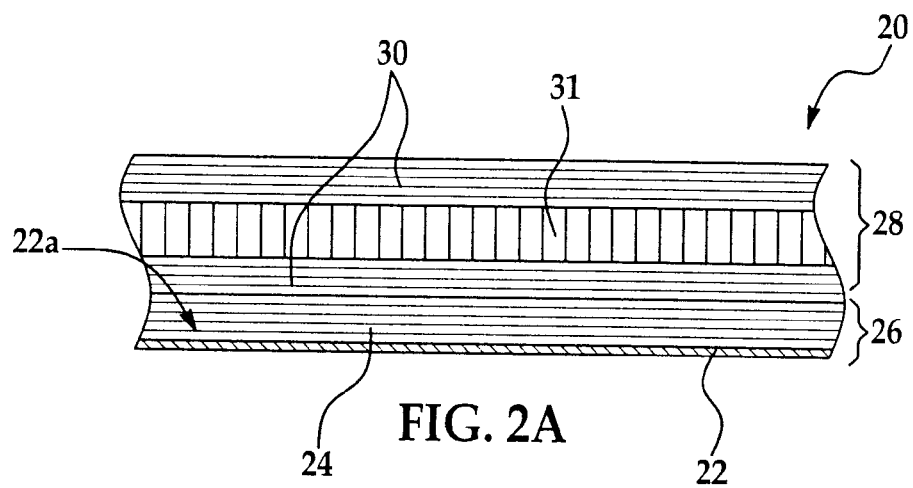
FIG. 2 is a sectional illustration taken along the line 2-2 in FIG. 1.
Figure 2:
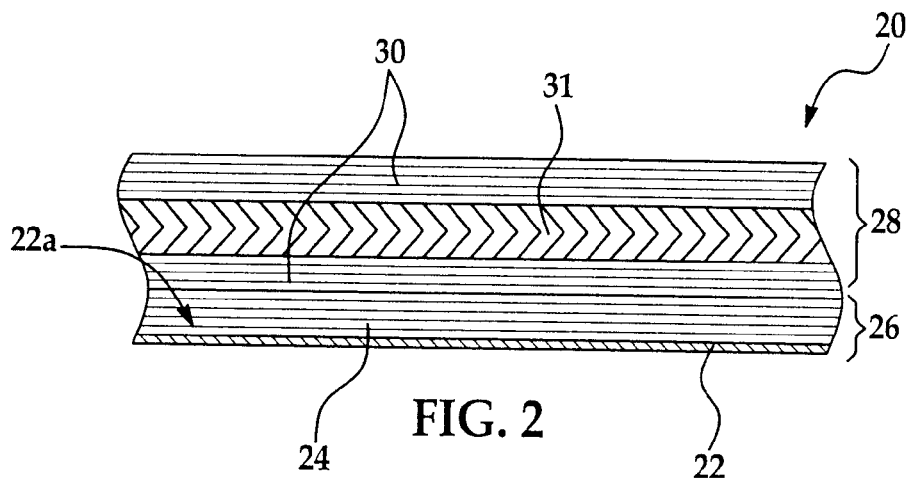

FIG. 2a. is a view similar to FIG. 2, but showing the condition of the core before it is partially crushed during the molding process used to fabricate the panel.

Figure 1:
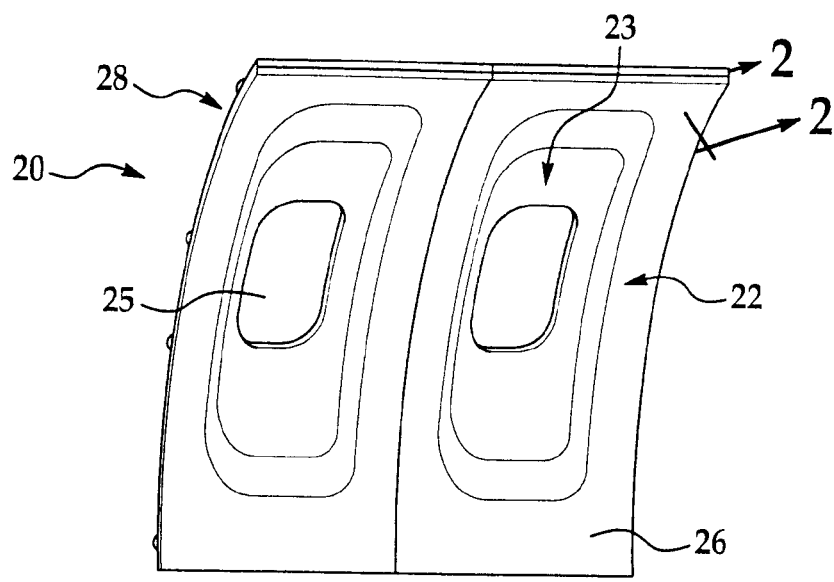
FIG. 1 is a perspective illustration of a curved interior cabin panel for an aircraft, having a decorative, textured surface fabricated by the disclosed embodiments.
Figure 3:
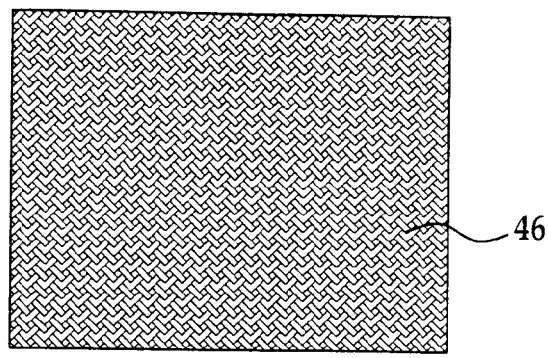

FIG. 3 is a plan illustration of a textured, flexible blanket used to form a textured surface on the panel shown in FIG. 1.

Figure 4:

FIG. 4 is a sectional illustration of a portion of the flexible blanket shown in FIG. 3.

FIGS. 5-15 are diagrammatic illustrations of apparatus used to form the textured surface panels, showing the successive steps of the fabrication method.

Figure 13:
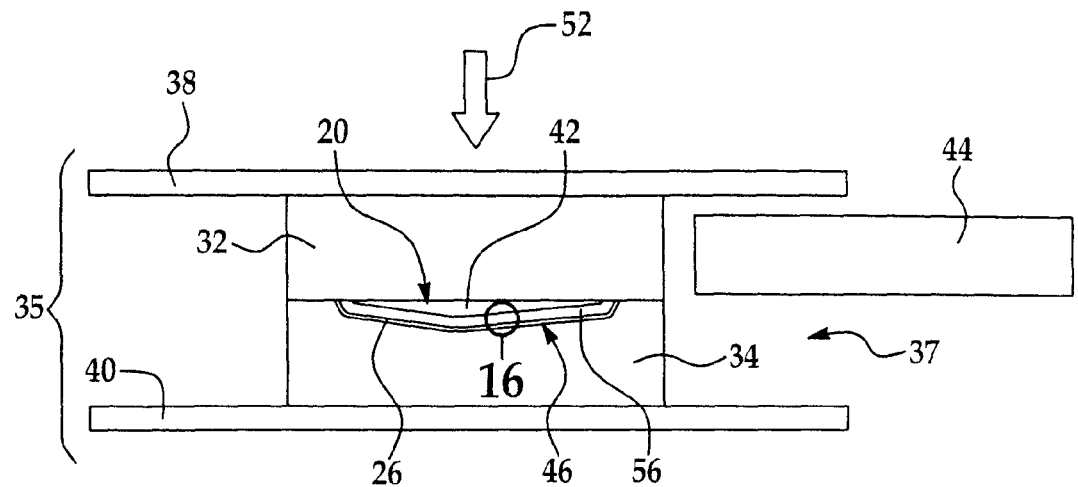
Figure 16:
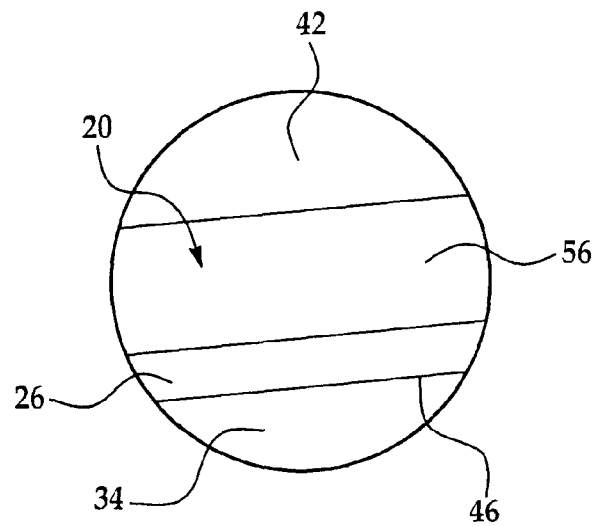

FIG. 16 is an enlarged illustration of the area indicated by the letter "A" in FIG. 13.

Figure 17:
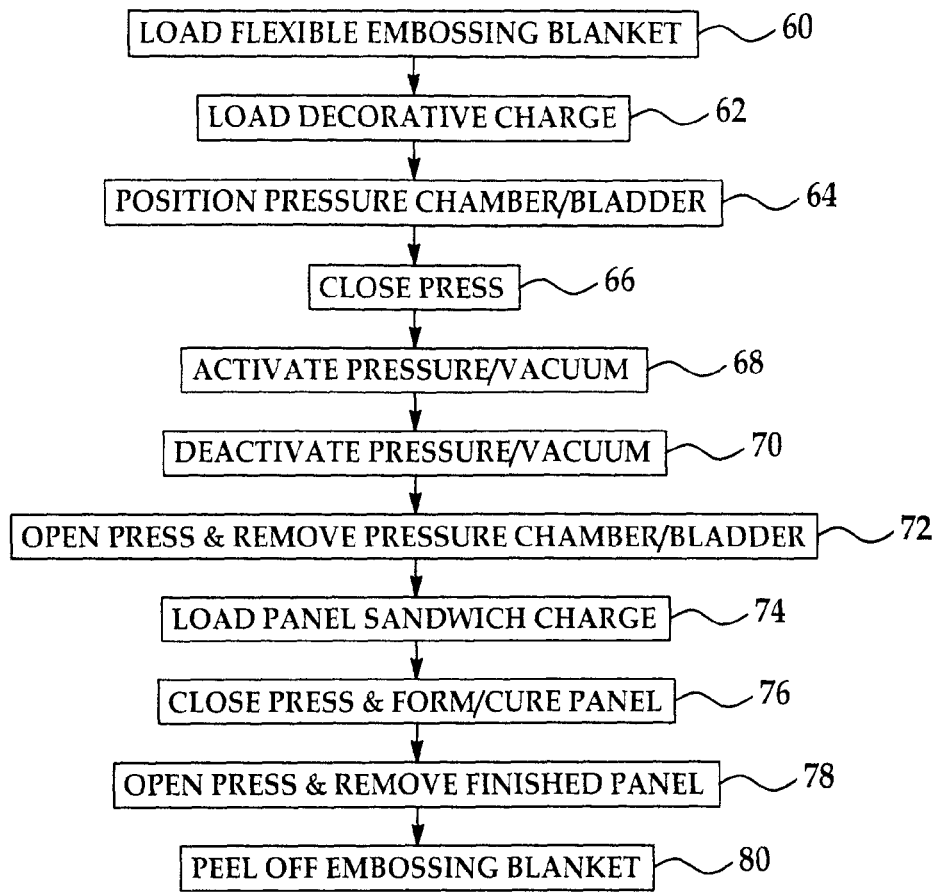

FIG. 17 is a simplified flow diagram illustrating the steps of the fabrication method.

Figure 18:
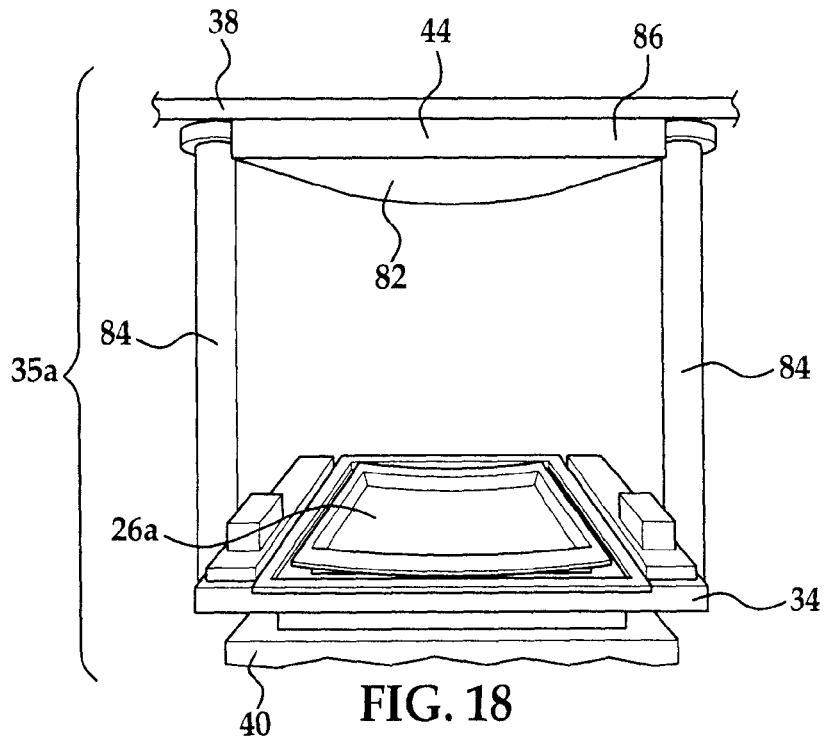

FIG. 18 is an isometric illustration of a press assembly used to fabricate a decorative shell having a textured surface.

Figure 19:
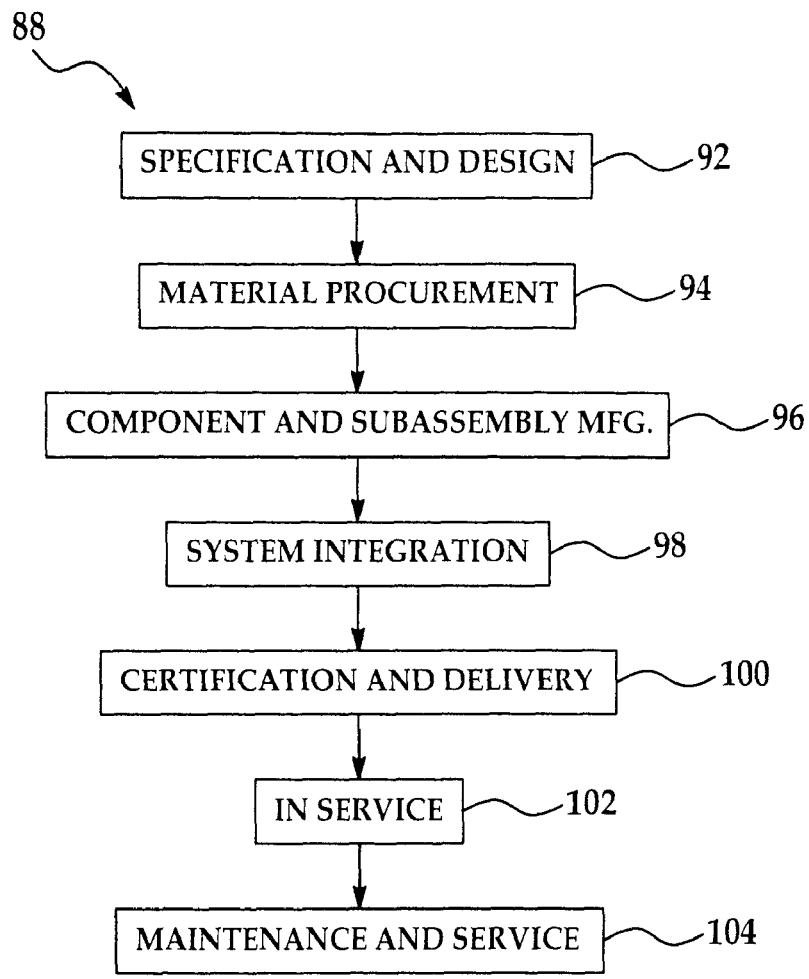

FIG. 19 is a flow diagram of aircraft production and service methodology.

Figure 20:
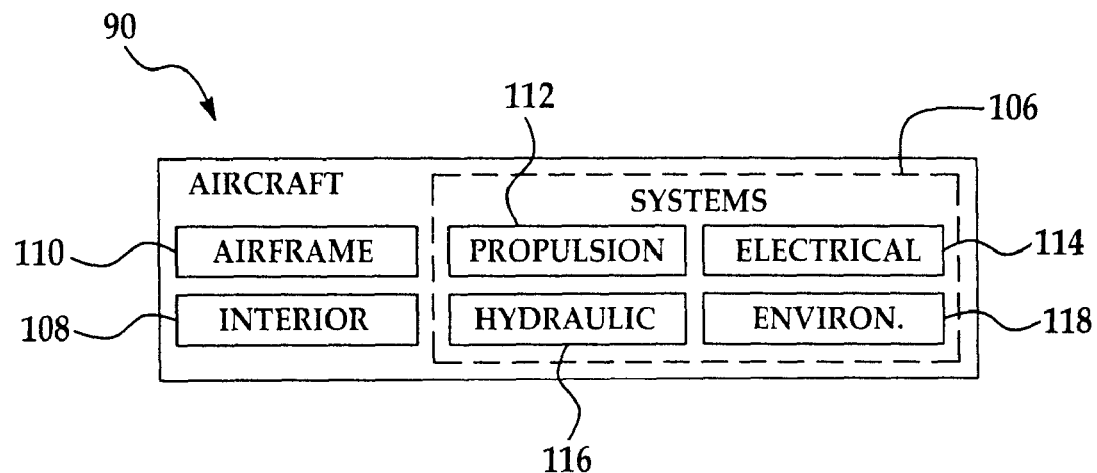

FIG. 20 is a block diagram of an aircraft.

DETAILED DESCRIPTION

Referring first to FIGS. 1 and 2, embodiments of the disclosure relate to a method and apparatus for forming articles having textured outer surfaces. In the illustrated embodiment, the articles may comprise, for example, without limitation, a curved panel 20 used as an interior sidewall in an aircraft or similar vehicle. Other examples (not shown) of curved panels having decorative surfaces used in aircraft include, for example, without limitation, hatches, bin doors, ceiling panels, etc. The panel 20 possesses an overall curvature generally corresponding to that of the aircraft's fuselage, but may also include other simple or compound curves and contours, such as the reliefs 23 that may surround window openings 25.

As shown in FIG. 2, the panel 20 broadly comprises an outer composite shell 26 bonded to an inner composite panel 28. The shell 26, which faces the interior cabin of the aircraft, may comprise an outer textured film 22 bonded to one or more inner layers 24 of composite materials, such as fiber reinforced polymer materials in fabric or other forms. The inner panel 28 may comprise one or more layers 30 of a fiber reinforced polymer, between which there is sandwiched a light-weight, honeycomb core 31 such as, without limitation, NOMEX®. Other types of cores are possible. As shown in FIG. 2, the core 31 has been partially crushed as a result of one process that may be used to fabricate the panel 20, known as crushed core molding, which will be described below. FIG. 2a illustrates the panel 20 before crushing of the core 31 during the molding process. The inner panel 28 may essentially provide the panel 20 with the required rigidity, while the outer shell 26 functions to cover the surface of the inner panel 28, or for merely decorative purposes. The decorative film 22 may employ any desired texture and may be formed of a clear material having printed decorative patterns on the inside face 22a thereof.

Referring now also to FIGS. 3-17, an article such as the panel 20 having a textured surface may be fabricated using a compression molding press 35 which includes a heated compression mold 37. The press 35 may be used to carry out a crushed core molding process, in which the mold 37 is used to partially crush the core 31. Mold 37 may include a male portion 32 and a female portion 34 respectively mounted on opposing platens 38, 40 of the press 35. The male mold portion 32 includes a male feature 42 which may be received within a mold cavity 36 in the female mold portion 34 when the mold 37 is closed. A pressurizer 44, whose purpose will be described below, is laterally shiftable to a position overlying the female mold portion 34, above the mold cavity 36. The bottom of the mold cavity 36 may be configured to form the outside curvature of the panel 20.

Figure 5:
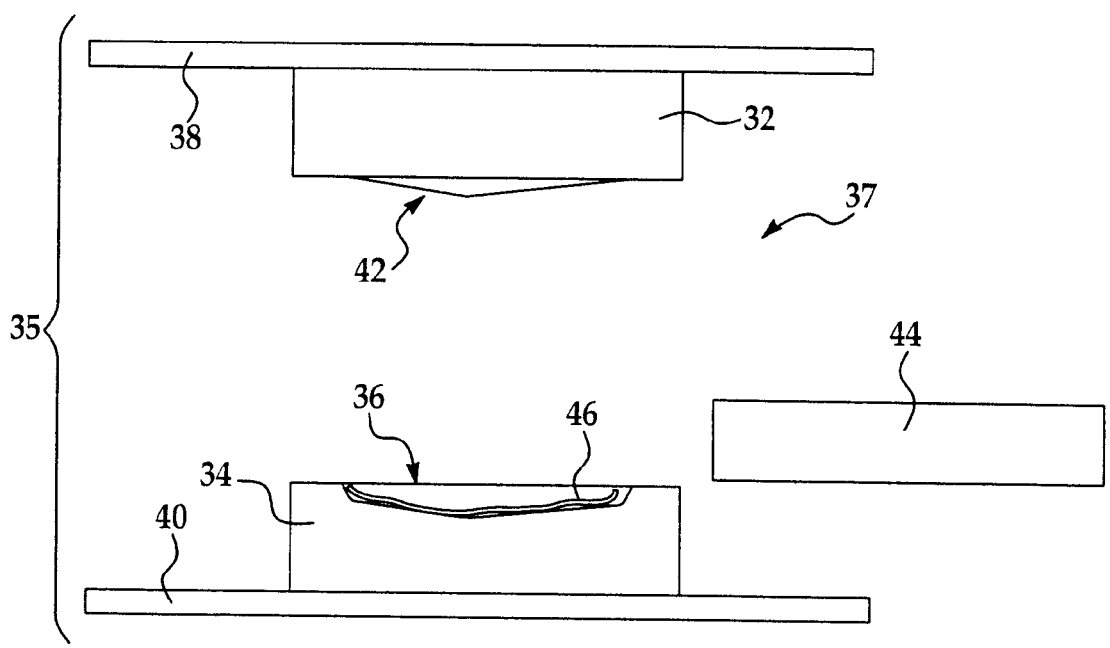

With the mold 37 open, as shown in FIG. 5, the first step 60 (FIG. 17) in the fabrication method involves loading a flexible tool in the form of an embossing blanket 46 into the mold cavity 36. As shown in FIGS. 3 and 4, the embossing blanket 46 may be a planar, flexible sheet-like member having a textured surface 54 on one side thereof. The embossing blanket 46 should be sufficiently soft and flexible to conform to the contour of the mold cavity 36, but yet hard enough to emboss a pattern on the film 22 when subjected to the level of pressure applied by the pressurizer 44. Moreover, the embossing blanket 46 should remain flexible after the forming process so that it may be peeled off without damaging the decorative surface left on the film 22, or the textured surface 54 on the blanket 46.

The decorative pattern formed by the textured surface 54 is imparted to the film 22, thereby embossing the film, as will be discussed below. Due to its flexibility, the embossing blanket 46 conforms to the bottom of the mold cavity 36 and is positioned such that the textured surface 54 faces the male mold portion 32. As a result of the flexibility of the blanket 46 and the vacuum within the mold cavity, the textured surface 54 of the blanket 46 is pressed into the film 22 with sufficient force to emboss the film with the textured pattern of the blanket 46. At this stage, the pressurizer 44 is located disposed in a standby position, outside of the mold 37.

Figure 6:
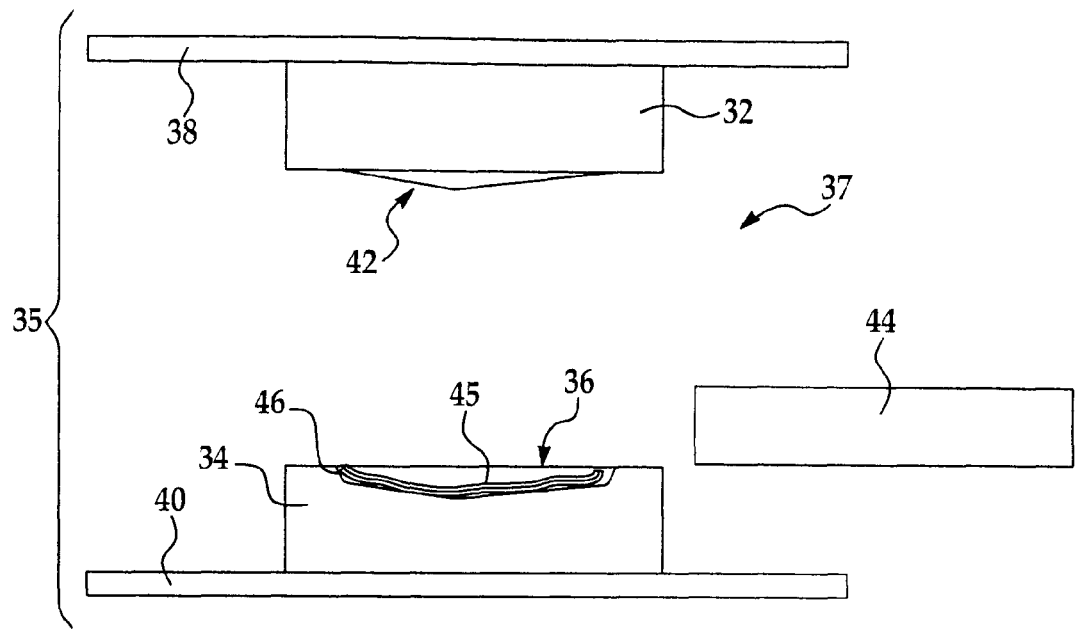

Next, as shown in FIGS. 6 and 17, a decorative charge 45 is loaded into the mold cavity 36 at step 62. The decorative charge 45 may comprise a film 22 along with one or more layers 24 of composite material, which may include a pre-preg for example. The decorative film 22 may comprise by way of example, without limitation. TEDLAR® available from DuPont Engineering Polymers. During step 62, the decorative charge 45 is placed over the upper surface of the embossing blanket 46 so that the film 22 faces the textured surface 54 of the blanket 46. The decorative film 22 may comprise, by way of example, and without limitation, a single or multi-ply plastic laminate, including an optically clear layer of PVF (Polyvinyl Fluoride). The film 22 may be bonded to the pre-preg of plies 24 using a layer of film adhesive such as Bostik® embossing film available from Bostik.

Figure 7:
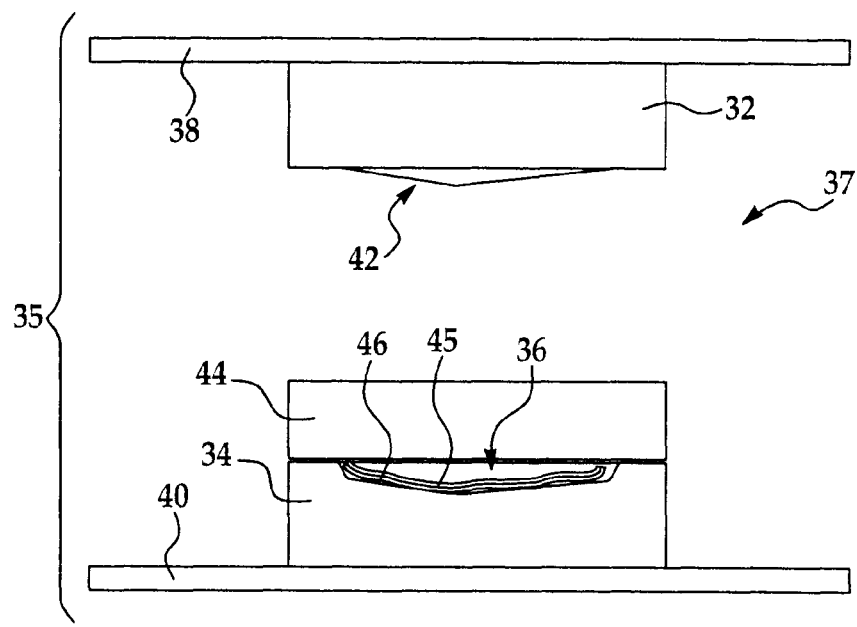

As shown in FIGS. 7 and 17, the next step 64 of the fabrication method involves moving the pressurizer 44 in the direction of the arrow 50, laterally into its operative position, overlying the mold cavity 36. The edges of the pressurizer 44 are then sealed to the periphery of the mold cavity 36, thereby rendering the mold cavity 36 essentially air tight. The pressurizer 44 may comprise any suitable device for imparting pressure of sufficient magnitude against and uniformly across the decorative charge 45. For example, the pressurizer 44 may comprise an inflatable bladder or similar pressure chamber.

Figure 8:
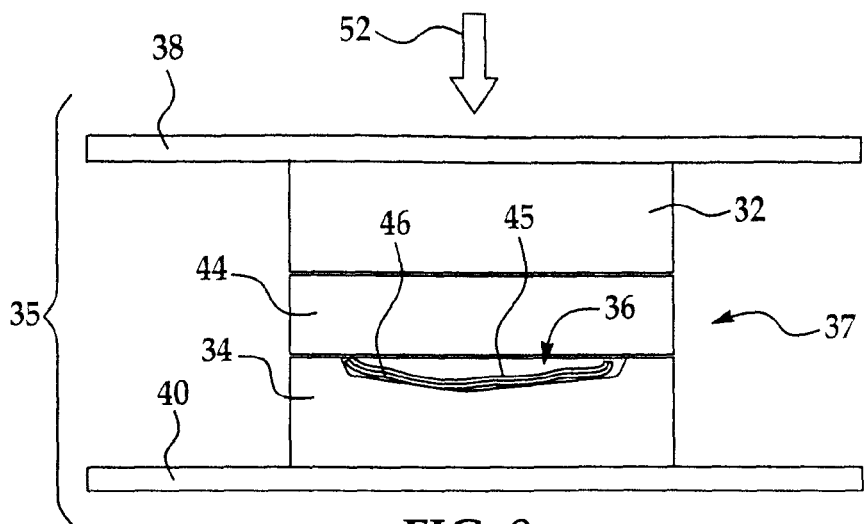
Figure 9:
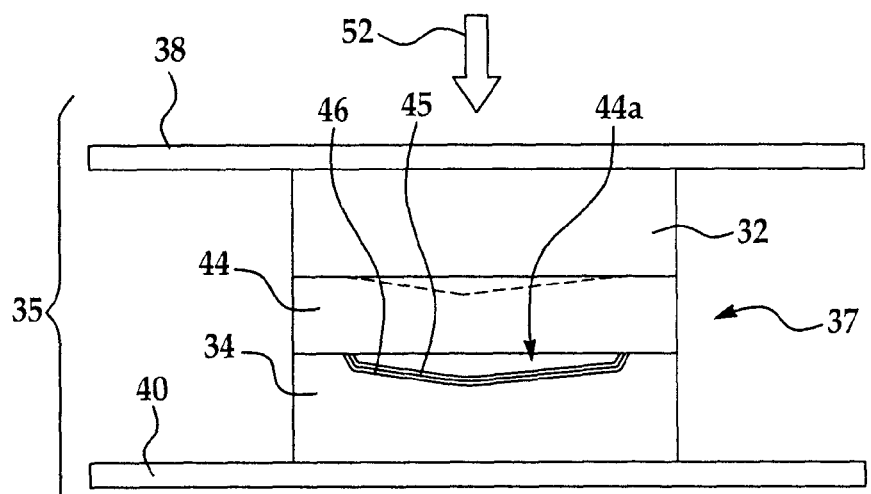

At step 66 (FIG. 17) the press 35 is closed, as shown in FIG. 8 and the pressurizer 44 is activated at step 68. Activation of the pressurizer 44 may involve supplying air or other fluid under pressure from a source (not shown) to the pressurizer 44 which results in pressurizing the mold cavity 36. FIG. 9 shows a bladder 44a having been pressurized and expanding into the mold cavity 36 so as to apply uniform pressure over the upper face of the decorative charge 45. The uniform force applied by the bladder 44a compresses the charge 45 against the bottom of the mold cavity 36, causing the textured surface 54 of the blanket 46 to be embossed into the surface of the decorative film 22. The pressure applied by the bladder 44a also results in both the consolidation of the decorative charge 45 and molding of the charge 45 so as to conform to the shape of the mold cavity 36. Because the decorative film 22 and plies 24 form a rigid shell 26, rough areas or mark-off on the panel 28 may not be seen, consequently any rough patches on the inner panel 28 need not be filled in or subsequently smoothed out.

Figure 10:
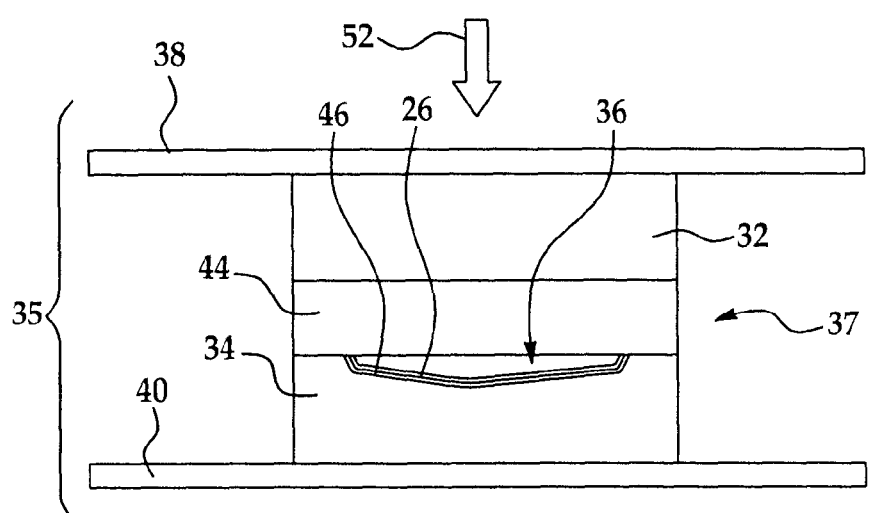

At step 70 (FIG. 17) the pressurizer 44 is deactivated, resulting in retraction of the bladder 44a, as shown in FIG. 10. At this point, as a result of the heat and pressure applied to the decorative charge 45 by the mold 37, a fully formed shell 26 has been produced having essentially the final shape of the panel 20 with a decorative, textured outer surface.

Figure 11:
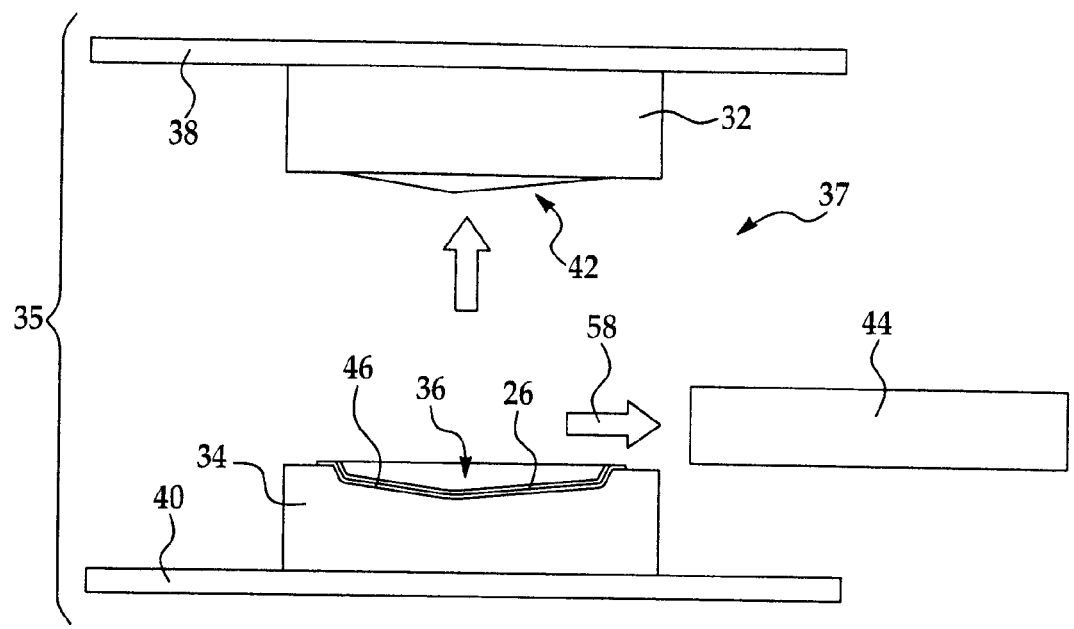
Figure 12:
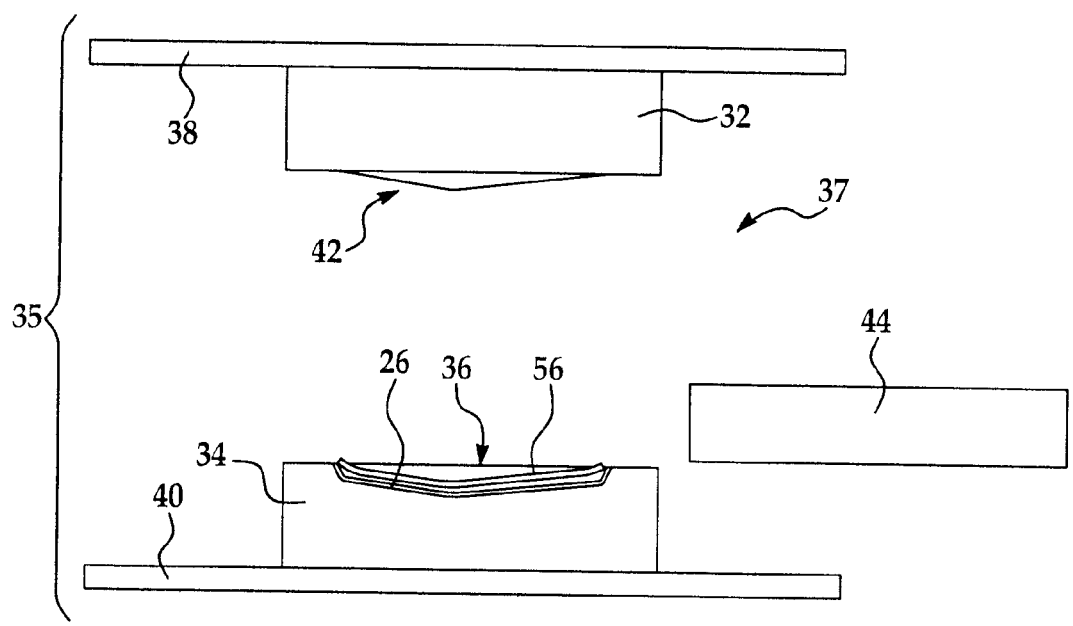

At step 72 (FIG. 17) the press 35 is opened, as shown in FIG. 11, and the pressurizer 44 moved laterally in the direction of arrow 58 to its standby position (see FIG. 11). Then, at step 74 (FIG. 17) a second charge 56 is introduced into the mold cavity 36 as shown in FIG. 12, and is placed over the fully formed shell 26 (FIG. 12). The second composite charge 56 may comprise a sandwich comprising a core 31 sandwiched between multiple plies 30 of fiber reinforced composite material, for example. Alternatively, the individual plies 30 and core 31 may be laid up over the shell 26, piece-by-piece.

As shown in FIGS. 13, 16 and 17, the next step 76 consists of closing the press 35. As a result of the pressure and heat applied by the press 35, the second composite charge 56 is consolidated with the shell 26 to form a fully consolidated panel 20. During this phase of the consolidation and molding process, the core 31 is partially crushed. The panel 20 may remain in the heated mold 37 a requisite period of time to cure the pre-preg materials.

Figure 14:
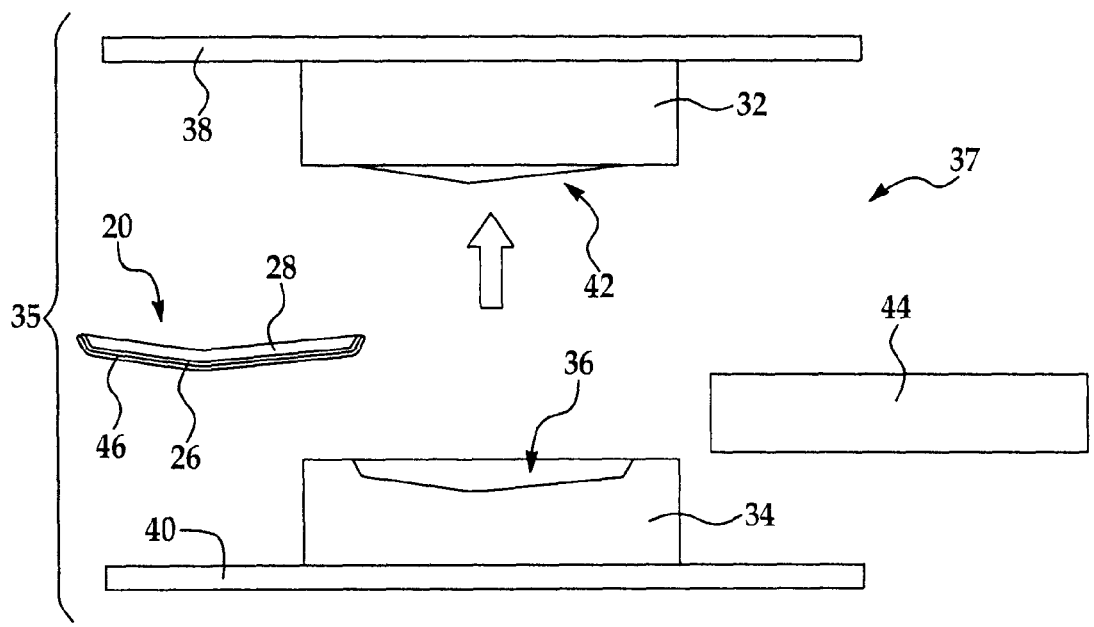
Figure 15:
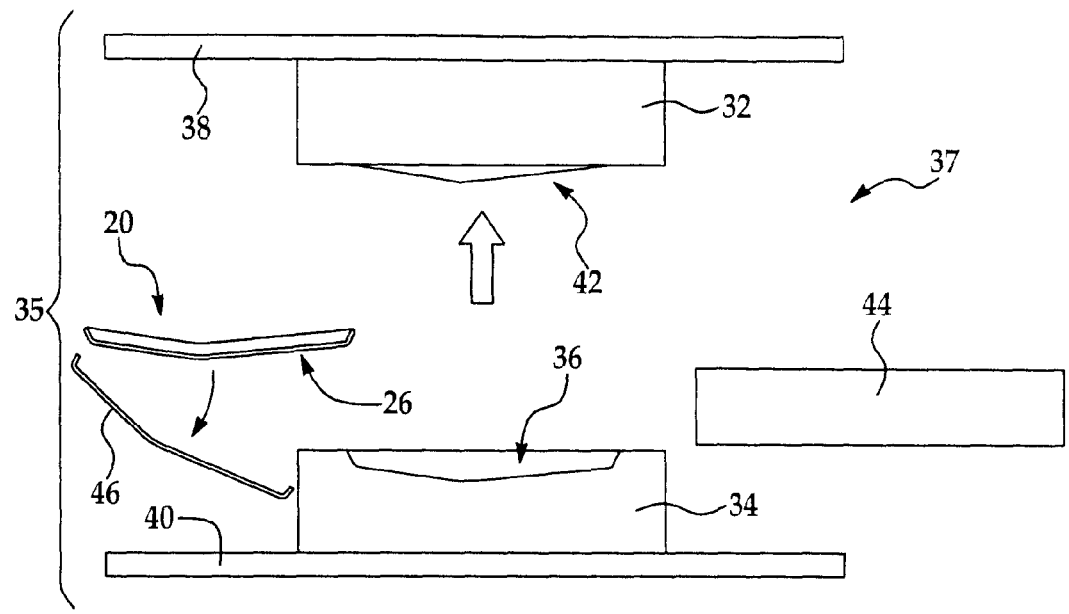

The next step 78 (FIG. 17) involves opening the press 35 and removing the finished panel 20, as shown in FIG. 14. At this point, the embossing blanket 46 remains adhered to the shell portion 26 of the panel 20. Finally, at step 80, the embossing blanket 46 is peeled away from the finished panel 20 as shown in FIG. 14, and may be reused to emboss additional panels in subsequent molding operations. Following removal of the panel 20 from the mold 37, the panel 20 is ready for any necessary secondary processes, such as, without limitation, trimming or attachment of hardware.

FIG. 18 shows an alternate press arrangement 35a used to form a sample shell 26a. The pressurizer 44 is mounted on an upper press platen 38 which may be moved downwardly using guides 84 until the pressurizer 44 is seated around the perimeter of the female mold portion 34. The pressurizer 44 shown in FIG. 18 comprises a bladder 82 held within a rigid rectangular frame 86. After the pressurizer 44 has been used to perform the embossing operation, it may be removed from the upper press platen 38 and replaced with a male portion 32 of the mold 37. Subsequently, a second charge including a core portion of panel 26a is inserted into the mold (as explained above with respect to FIG. 12), the press 35a then closed and the panel 26a formed in the final processing step.

Embodiments of the disclosure may find use in a variety of potential applications, particularly in the transportation industry, including for example, aerospace and automotive applications. Thus, referring now to FIGS. 19 and 20, embodiments of the disclosure may be used in the context of an aircraft manufacturing and service method 88 as shown in FIG. 19 and an aircraft 90 as shown in FIG. 20. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 88 may include specification and design 92 of the aircraft 90 and material procurement 94. During production, component and subassembly manufacturing 96 and system integration 98 of the aircraft 90 takes place. Thereafter, the aircraft 98 may go through certification and delivery 100 in order to be placed in service 102. While in service by a customer, the aircraft 90 is scheduled for routine maintenance and service 104 (which may also include modification, reconfiguration, refurbishment, and so on).

Each of the processes of method 88 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 20, the aircraft 90 produced by exemplary method 88 may include an airframe 110 with a plurality of systems 106 and an interior 108. Examples of high-level systems 106 include one or more of a propulsion system 112, an electrical system 114, a hydraulic system 116, and an environmental system 118. Any number of other systems may be included. Although an aerospace example is shown, the principles of the disclosure may be applied to other industries, such as the automotive industry.

Apparatus and methods embodied herein may be employed during any one or more of the stages of the production and service method 88. For example, components or subassemblies corresponding to production process 96 may be fabricated or manufactured in a manner similar to components or subassemblies produced while the aircraft 90 is in service. Also, one or more apparatus embodiments, method embodiments, or a combination thereof may be utilized during the production stages 96 and 98, for example, by substantially expediting assembly of or reducing the cost of an aircraft 90. Similarly, one or more of apparatus embodiments, method embodiments, or a combination thereof may be utilized while the aircraft 90 is in service, for example and without limitation, to maintenance and service 104.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a composite panel having a decorative textured surface, comprising sequentially the steps of:
   (A) placing a flexible tool having a textured surface in a female portion of a compression mold, said flexible tool contained within said compression mold;

(B) placing a first composite charge having a decorative film in said female portion of the mold over said flexible tool;

(C) embossing said decorative film by pressing said textured surface on said flexible tool into said decorative film while said first composite charge is in the mold, said pressing being carried out by placing a pressurizer in said female portion of the mold over said flexible tool and said first composite charge;

(D) after completion of said embossing step, placing a second composite charge in the mold over an embossed first composite charge; and, (E) consolidating said first and second composite charges in a compaction process within the mold by engaging a male portion of the mold with said female portion of said mold while said first and second charges are within said female portion of said mold.

2. The method of claim 1, wherein step (A) is performed by placing a flexible embossing blanket onto the first composite charge while the mold is open.

3. The method of claim 1, wherein step (C) includes:
placing said pressurizer over the tool and the first composite charge, and,
applying force to a surface of the tool using the pressurizer.

4. The method of claim 3, wherein step (C) further includes sealing the pressurizer against the periphery of the female portion of the mold.

5. The method of claim 1, further comprising the step of:
(F) crushing a core in the second composite charge during compaction of the first and second composite charges within the mold.

6. The method of claim 1, wherein step (D) includes laying up multiple plies of pre-preg fabric in the mold.

7. The method of claim 1, further comprising the steps of:
(F) removing the combination of the panel and the tool from the mold; and
(G) separating the tool from the panel.

8. The method of claim 1, further comprising the step of:
(F) curing the consolidated charges during compaction within the mold.

9. A method of fabricating a composite aircraft panel having a textured surface, comprising sequentially the steps of:

(A) placing a flexible embossing blanket into a female portion of a compression mold while the mold is open, said embossing blanket contained within said mold;

(B) placing a first composite charge having a decorative film in the female portion of the mold over the embossing blanket in the mold with the film facing the textured surface of the embossing blanket;

(C) closing the mold;

(D) embossing the decorative film while the mold is closed by pressing the textured surface of the blanket onto the decorative film while the first composite charge is in the mold, the pressing being performed by placing a bladder in the mold over the blanket and the first composite charge, sealing the bladder against the periphery of a portion of the mold and applying force to a surface of the blanket by expanding the bladder within the mold;

(E) opening the mold;

(F) removing the bladder from the mold;

(G) placing a second composite charge in the female portion of the mold over the first composite charge, including forming the second composite charge by laying up multiple plies of pre-preg fabric in the mold;

(H) compacting and consolidating the first and second charges within the mold by engaging the male portion of the mold with the female portion;

(I) crushing a core in the second composite charge during compaction of the first and second composite charges within the mold;

(J) curing the consolidated first and second charges within the mold to form the panel;

(K) removing the combination of the panel and the embossing blanket from the mold; and (L) separating the embossing blanket from the panel.

10. The method of claim 1 wherein the wherein the pressurizer comprises an inflatable bladder.

11. The method of claim 1, wherein the flexible tool comprises an embossing blanket.

12. A method of fabricating a composite panel having a decorative textured surface, comprising sequentially the steps of:

placing an embossing blanket having a textured surface in a female portion of a compression mold, said embossing blanket contained within said mold;

placing a first composite charge including a decorative film in the female portion of the mold over the tool;

embossing the decorative film by pressing the textured surface of the tool into the decorative film while the first composite charge is in the mold, said pressing by placing a pressurized inflatable bladder into the female portion of the mold over the blanket and the first composite charge;

placing a second composite charge in the mold over the first composite charge following said embossing;

consolidating the first and second charges during compaction within the mold by engaging a male portion of the mold with said female portion of said mold while said first and second charges are within said female portion of said mold;

curing the consolidated first and second charges within the mold to form the panel;

removing the combination of the panel and the embossing blanket from the mold; and separating the embossing blanket from the panel.

* * * * *